Oct. 13, 1925.　　　　　　　　　　　　　　　1,557,295
W. E. JOHNSTON
PICTURE PROJECTING MACHINE
Filed April 21, 1923　　　　2 Sheets-Sheet 1
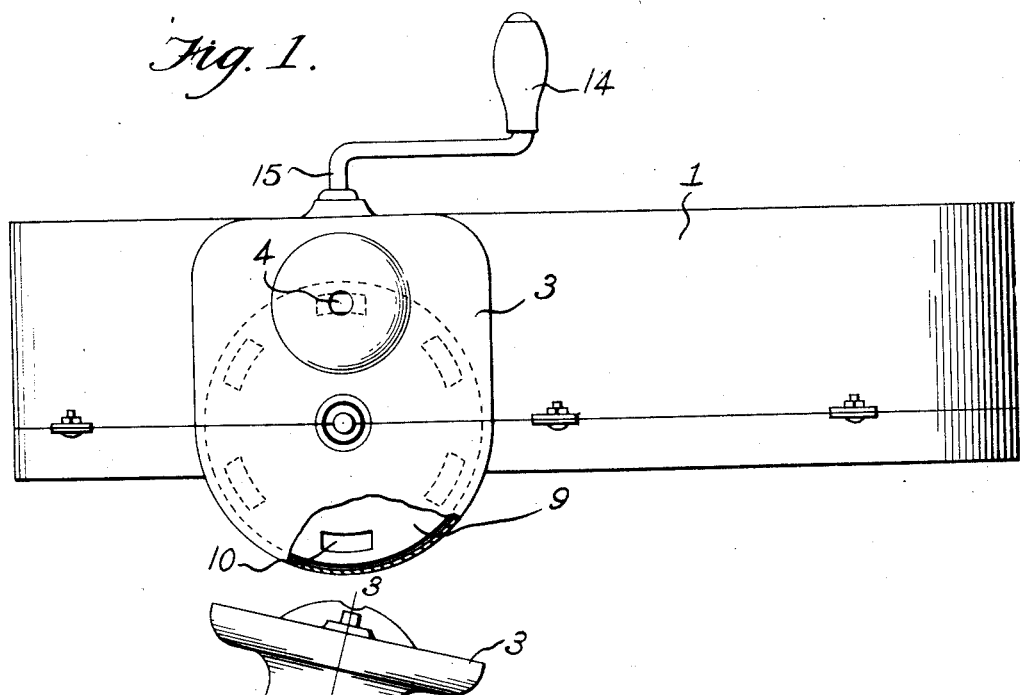
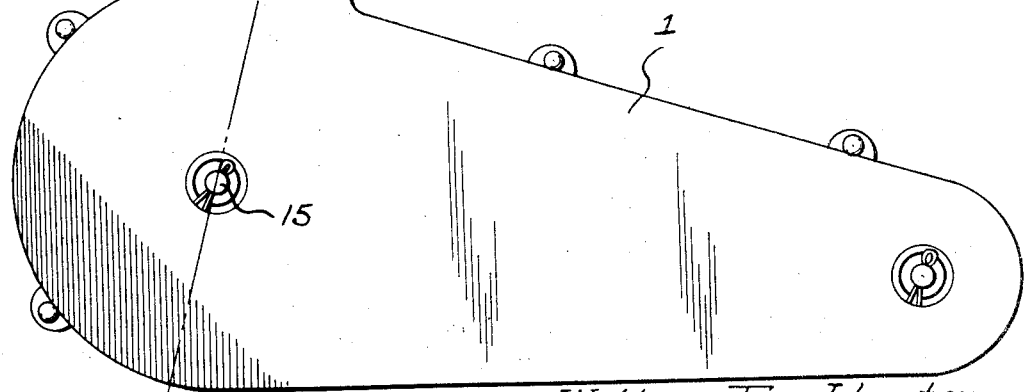
Walter E. Johnston
INVENTOR Oct. 13, 1925.

W. E. JOHNSTON

PICTURE PROJECTING MACHINE

Filed April 21, 1923

Walter E. Johnston
INVENTOR

BY Victor J. Evans
ATTORNEY

Patented Oct. 13, 1925.

1,557,295

UNITED STATES PATENT OFFICE.

WALTER E. JOHNSTON, OF YOUNGSTOWN, OHIO.

PICTURE-PROJECTING MACHINE.

Application filed April 21, 1923. Serial No. 633,705.

*To all whom it may concern:*

Be it known that I, WALTER E. JOHNSTON, a citizen of the United States, residing at Youngstown, in the county of Mahoning and State of Ohio, have invented new and useful Improvements in Picture-Projecting Machines, of which the following is a specification.

This invention relates to a picture viewing machine, the general object of the invention being to provide means whereby the pictures, as viewed, will have the appearance of motion pictures.

Another object of the invention is to so arrange the parts that the shutter and the strip carrying the pictures can be moved by turning a crank.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the invention.

Figure 2 is a side view thereof.

Figure 4:
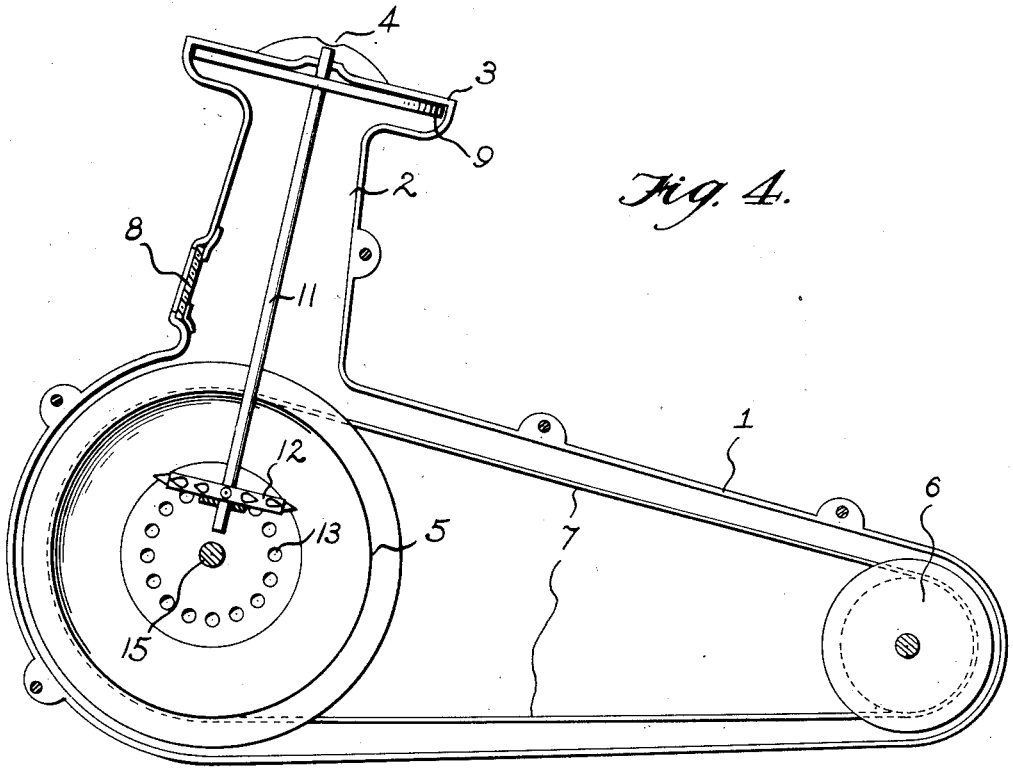
Figure 4 is a longitudinal sectional view.
Figure 3:
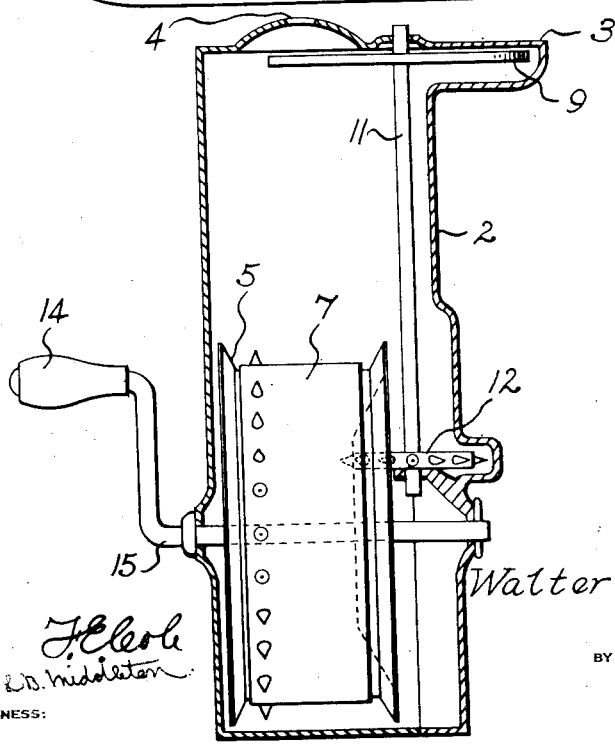
Figure 3 is a section on line 3—3 of Figure 2.

In these views 1 indicates a casing which is provided with an upwardly extending part 2, the upper end of this part being enlarged, as shown at 3, and having therein a peep-hole 4. A drum 5 is rotatably mounted at one end of the casing and under the extension 2 and a small drum 6 is rotatably mounted at the opposite end of the casing. A strip 7 passes over said drums, said strip containing the pictures to be shown. A window 8 is arranged in the extension 2 in such a manner that light passing through the same will illuminate the picture which is opposite the extension so that a person with his eye to the peep-hole can see this picture. A shutter 9 is arranged in the enlargement 3 with the spaced openings 10 therein adapted to register with the peep-hole as the shutter revolves. The shutter is connected with the upper end of the shaft 11, suitably supported in the casing, and has at its lower end a pinion 12 which meshes with a gear 13 on the drum. A handle 14 is connected with the shaft 15 of the drum.

It will thus be seen that as the handle is revolved the shutter will be rotated and also the drum and a person looking through the peep-hole will see the pictures on the strip as they are brought upon the top part of the drum. The parts are so arranged that the peep-hole will be closed by the shutter as a new picture is being brought into position where it can be seen. Thus an effect will be secured of motion pictures. Instead of the revolving shutter other types of shutters can be used, such as a reciprocating one, and the strip carrying the pictures may be placed on a large drum.

It is thought from the foregoing description that the advantages and novel features of my invention will be readily apparant.

I desire it to be understood that I may make changes in the construction and in the combination and arrangement of the several parts, provided that such changes fall within the scope of the appended claim.

What I claim is:—

A device of the class described comprising an elongated casing having an upwardly extending part at one end thereof which is provided with a sight opening in its top, drums in the end portions of the casing, an endless strip passing over the drum and having pictures thereon, a rotary shutter in the top of the extension for controlling the sight opening, a shaft to which the shutter is connected, gears connecting the shaft with one of the drums, a handle connected with this drum for rotating the same and a window in the extension for permitting illumination of the pictures on the strip as they pass under the sight opening.

In testimony whereof I affix my signature.

WALTER E. JOHNSTON.